July 12, 1938.　　　　F. E. STAHL　　　　2,123,865
FASTENING MEANS FOR TIRE CHAINS
Filed May 12, 1937
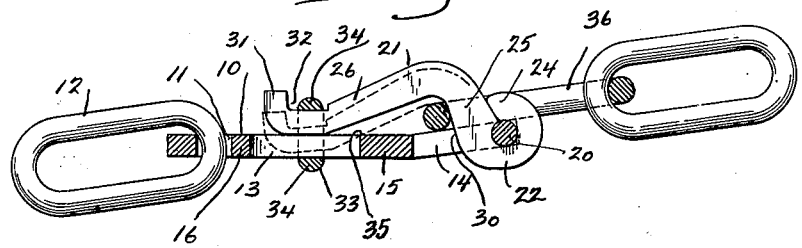
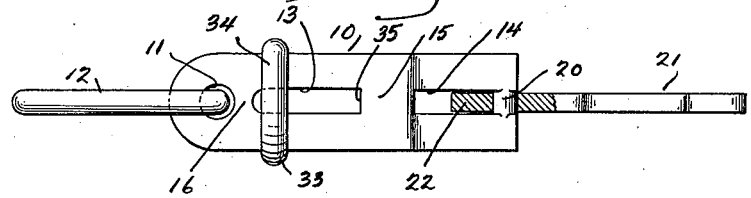
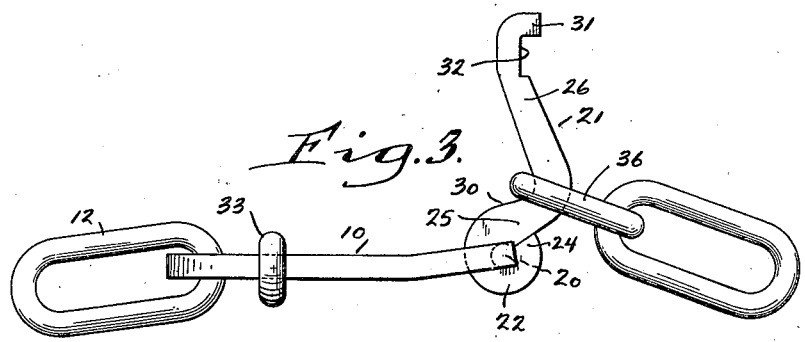
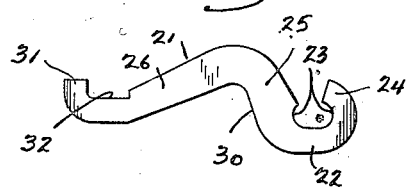
Inventor,
FRANK E. STAHL
by J. W. Ellis
Attorney.

Patented July 12, 1938

2,123,865

UNITED STATES PATENT OFFICE 2,123,865

FASTENING MEANS FOR TIRE CHAINS

Frank E. Stahl, Tonawanda, N. Y., assignor to Columbus McKinnon Chain Corporation, Tonawanda, N. Y., a corporation of New York Application May 12, 1937, Serial No. 142,220

1 Claim. (Cl. 24—69)

My invention relates in general to fastening means for tire chains and particularly to fastening means for the side chains of anti-skid devices of the "Weed" type.

My invention is of the type of fastener which is used to connect the two ends of side chains of anti-skid devices of the type that provides a cam action which enables the operator to easily draw the two ends of the chain together to the desired tautness.

The principal object of my invention has been to provide a fastener of this nature which shall be simple and inexpensive to manufacture.

Another object has been to provide a fastener which will require no springs but which will securely lock the two ends of the chain together against accidental opening.

A further object has been to provide a device of this nature which may be made from metal stampings.

The above objects and advantages have been accomplished by the device shown in the accompanying drawing, of which:

Fig. 1 is a side, sectional elevation of my device when in use.

Fig. 2 is a plan view of the device in its open position ready to receive the free end of the chain.

Fig. 3 is a side elevation of the same with the free end of the chain engaged with the latch lever, and Fig. 4 is a side elevation of the latch lever showing its pivotal end before being assembled with the body of the device.

My device comprises a body 10 which is preferably of heavy, one-piece sheet metal stamped in the form shown. The body is provided at one end with an aperture 11 for the reception of the link 12 at one end of the side chain of the anti-skid device. Slots 13 and 14 are formed midway the width of the body and are separated by a dividing wall 15. A dividing bar 16 separates the end of the slot 13 from the opening 11. A pivot pin 20 is formed at the extreme end of the body, and the slot 14 is terminated at that end by means of this pivot pin. The pivot pin is preferably rounded so as to pivotally support the latch lever 21 in proper manner. The portion of the body in which the slot 14 is formed is preferably bent upwardly with respect to the other portion of the body, as clearly shown in Figs. 1 and 3.

The latch lever 21, which is preferably a stamping, is provided with a pivot portion 22 which is formed, as shown in Fig. 4, with interspaced recesses 23, one of which is formed in a bendable arm 24. The recesses, as shown in Fig. 4, are so spaced apart at their upper ends that there is an opening therebetween through which the pivot pin 17 may be passed when the lever is to be assembled. After the pivot part of the lever has been placed about the pivot pin, the arm 24 is bent toward the body of the lever to the position shown in Figs. 1 and 3 and the recesses 23 will, therefore, be forced toward each other and thus provide the pivot opening for the lever. The lever is formed with an upwardly extending arm 25 and with a rearwardly and downwardly extending arm 26. These arms are arranged at an angle with each other, as shown in the drawing, whereby a cam surface 30 is provided which will enable the operator to easily draw the free end of the chain toward the opposite end thereof and place the chain under the desired tension as the lever is being moved from the position shown in Fig. 3 to the closed position shown in Fig. 1. At the outer end of the arm 26 of the lever there is formed a detent lug 31 behind which is a recess 32. Slidably mounted upon the body is a lock clip 33 which is in the form of a rectangular ring encircling the body. The side members 34 of the clip are spaced apart sufficiently so as to permit the upper member to pass over the top of the detent lug 31 when the latch lever is in the dotted line position shown in Fig. 1. When in such position, the clip is slid along upon the body until it occupies a position over the recess 32. The parts of my device are so proportioned that the upper member of the lock clip will just clear the top of the detent lug 31 of the latch lever when the bottom surface of the arm 26 of the latch lever is pressed firmly into engagement with the top edge 35 of the dividing wall 15. The lock clip will thus be retained within the recess and back of the detent lug at all times, except when the latch lever is moved to the dotted line position shown in Fig. 1, as just above described. It will be obvious that when tension is placed upon the chain, the link 36 of the free end thereof will be engaged with the surface 30 of the arm 25 of the lever and tend to rotate the lever about its pivot 20 in clockwise direction, thus keeping tension upon the lever and serving to keep the recess 32 of the lever in engagement with the clip 33, thereby holding the clip in place. Since the clearance between the upper member 34 of the clip and the lug 31 is just enough to permit the clip to be slid along when the lever contacts the edge 35 of the cross bar 15, there will be very little opportunity for the parts to become disengaged. My novel structure, therefore, makes possible the inexpensive manufacture of a device of this nature.

Obviously, some modifications of the details herein shown and described may be made without departing from the spirit of my invention or the scope of the appended claim, and I do not, therefore, wish to be limited to the exact embodiment herein shown and described, the form shown being merely a preferred embodiment thereof.

Having thus described my invention, what I claim is:

A fastening means for tire chains, comprising a one-piece body in the form of a stamping, said body being formed at one end with an opening for receiving the chain link at one end of a tire chain, said body being provided with two interspaced side walls extending longitudinally of the body, a dividing wall extending across and connected to said side walls intermediate their length, thus forming an intermediate slot and an end slot, a pivot bar connecting said side walls at their extreme ends, a latch lever having its pivot end arranged within the end slot and pivotally mounted upon said pivot bar, said lever having its free end engageable with the intermediate slot and the upper edge of the dividing wall to stop its passage through the intermediate slot, the free end of said lever being formed with a detent lug and a recess, and a lock clip mounted upon the body and engageable with the recess of the latch lever, said detent lug being of such height as to permit the clip to pass over it when the lever is in engagement with the edge of the dividing wall.

FRANK E. STAHL.